Nov. 27, 1923.
G. W. WISELEY
BOLL WEEVIL DESTROYER
Filed Sept. 23, 1922
1,475,467
3 Sheets-Sheet 3
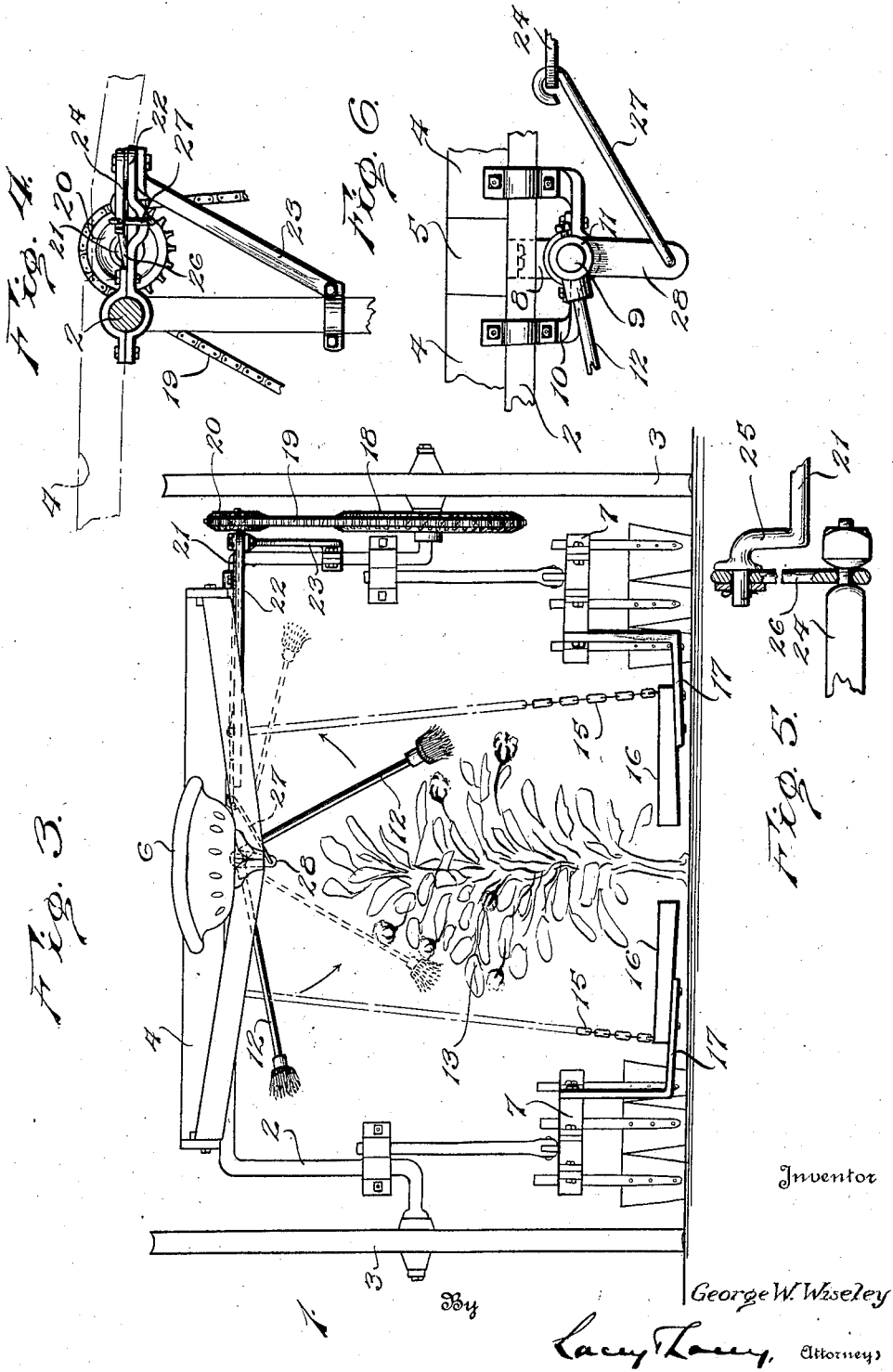
Inventor
George W. Wiseley
By
Lacey & Lacey, Attorneys Patented Nov. 27, 1923.

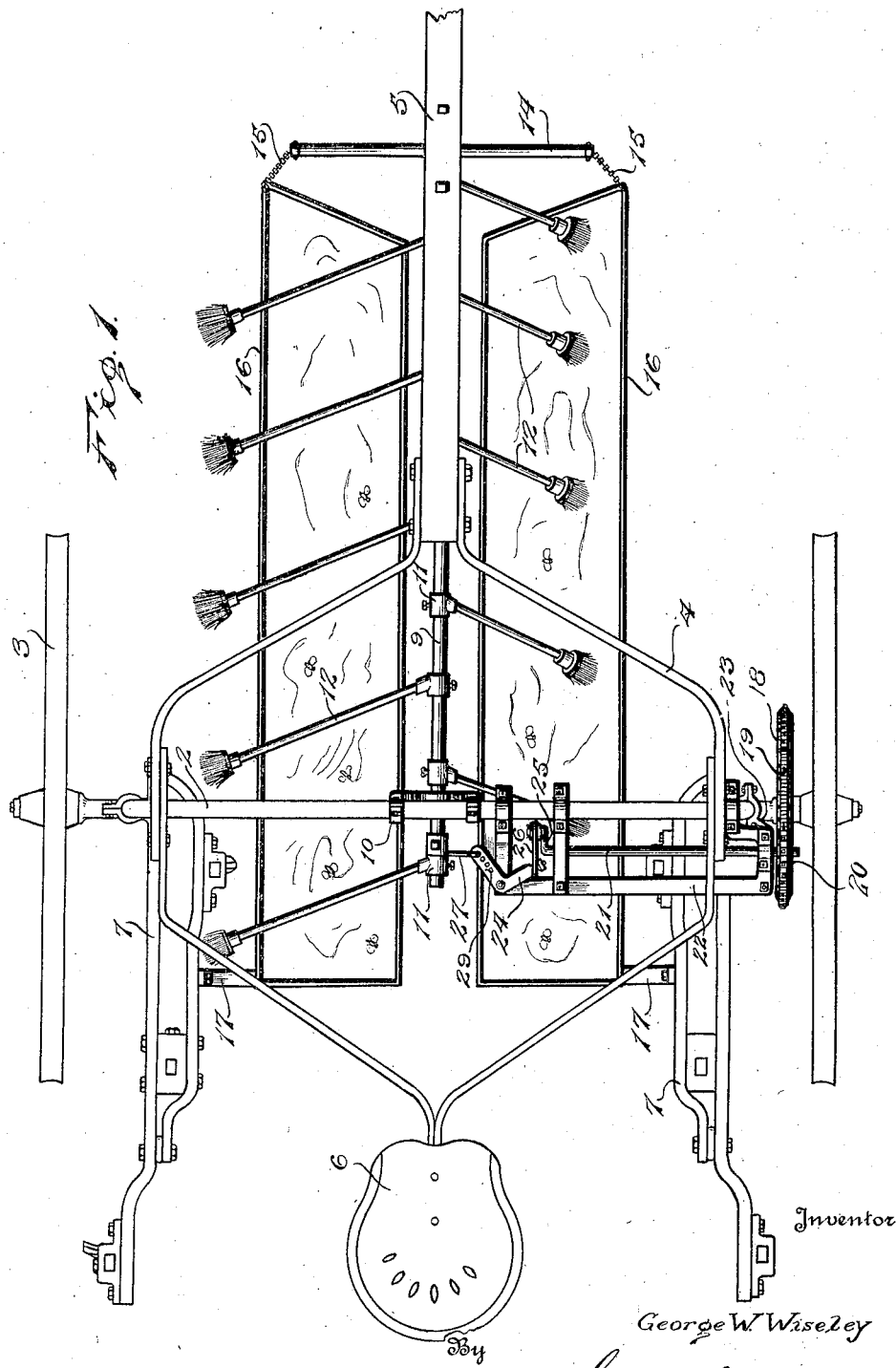

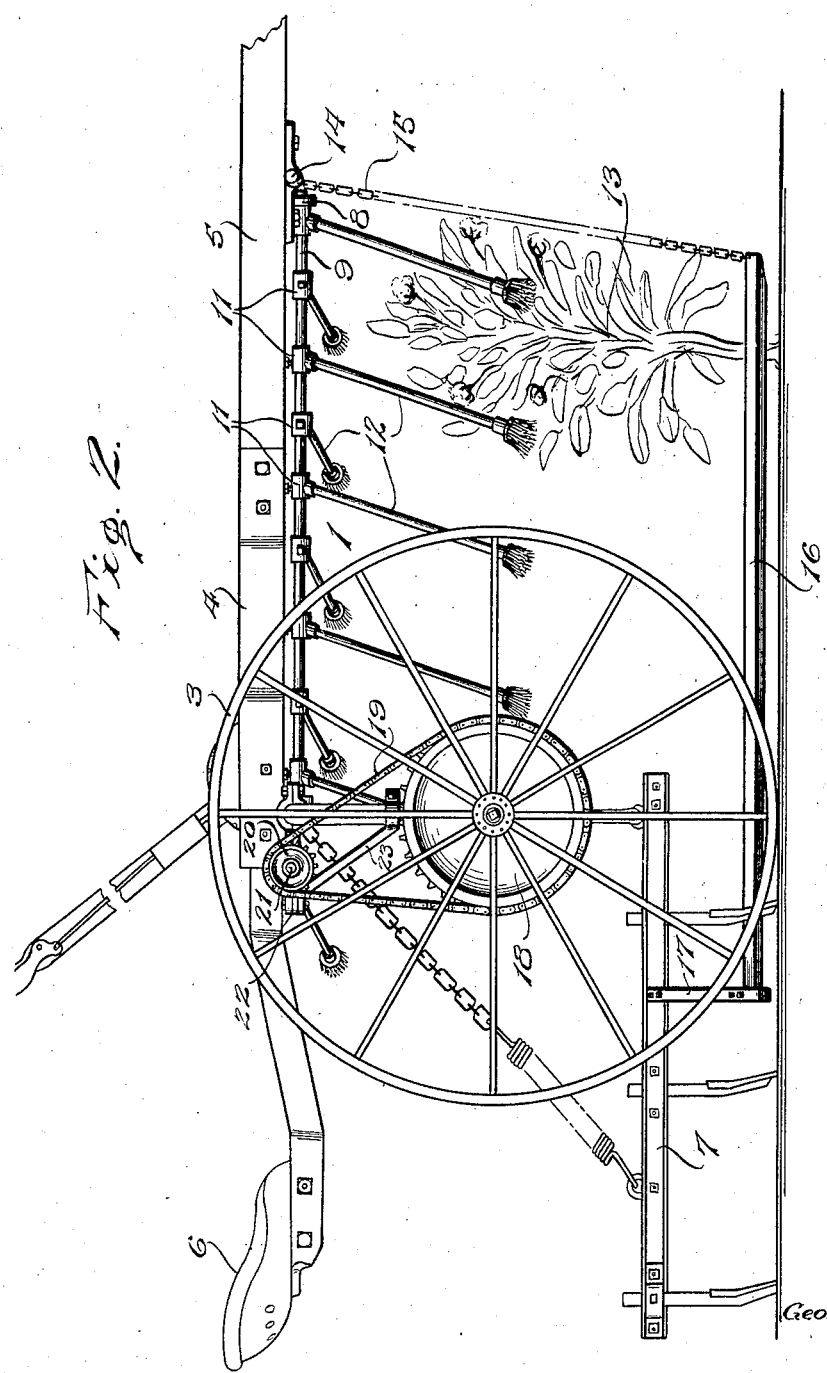

1,475,467

UNITED STATES PATENT OFFICE.

GEORGE W. WISELEY, OF HOLDENVILLE, OKLAHOMA.

BOLL-WEEVIL DESTROYER.

Application filed September 23, 1922. Serial No. 590,090.

*To all whom it may concern:*

Be it known that I, GEORGE W. WISELEY, a citizen of the United States, residing at Holdenville, in the county of Hughes and State of Oklahoma, have invented certain new and useful Improvements in Boll-Weevil Destroyers, of which the following is a specification.

This invention is an apparatus to be attached to a cultivator and operated by the travel of the cultivator along a row of plants to remove from the plants boll weevils and other pests which feed upon and destroy vegetation. The invention seeks to provide an apparatus which may be readily attached to any wheeled cultivator and cause a plurality of beaters to oscillate so as to impinge upon the plants and cause the insects feeding thereon to be released and dropped into gathering pans disposed below the beaters and carried by the cultivator at the sides of the plants. The invention is illustrated in the accompanying drawings and will be hereinafter fully set forth.

In the drawings—

Figure 1 is a plan view of a cultivator having my improved attachment applied thereto;

Fig. 2 is a side elevation of the same;

Fig. 3 is a rear end elevation thereof;

Fig. 4 is a detail view, partly in side elevation and partly in section, showing the operating mechanism as viewed from the inner end of the same;

Fig. 5 is a detail view of a portion of the operating mechanism, and

Fig. 6 is a detail end view of the beater shaft.

In the drawings, the reference numeral 1 indicates a wheeled cultivator which may be of any approved design and comprises essentially an arched axle 2 supported upon ground wheels 3 and carrying a frame 4 to the front side of which a draft tongue 5 is secured. A driver's seat 6 is also carried by the frame 4, and cultivator beams 7 are attached to the side portions of the arched axle 2, all these parts being well known and in themselves constituting no part of my invention.

In carrying out my invention, I secure to the under side of the tongue 5 a bearing 8 in which the front end of a rock shaft 9 is journaled, and upon the axle 2 at the center of the same, I secure a bracket 10 of suitable form in which the rear end of said rock shaft is journaled. At intervals along the rock shaft 9, I secure thereto clamp collars 11 in which brushes or beaters 12 of any preferred form are secured, said brushes or beaters extending alternately in opposite directions from the shaft, as clearly shown in Figs. 1 and 3, so that they will be disposed at opposite sides of the row of plants, indicated at 13. I also secure to the tongue 5 a cross bar 14, to the ends of which are secured the upper ends of chains or similar devices 15 which have their lower ends attached to and supporting the front ends of gathering pans 16. The said pans 16 extend longitudinally of the machine and are disposed at opposite sides of the row of plants and close to the ground so that all the insects which may be beaten from the bushes will be caught in the pans, the pans containing a quantity of oil or other material which will destroy the insects as they drop into the same. The rear ends of the pans are carried by brackets or hangers 17 which are secured to and depend from the cultivator beams 7, as shown in Figs. 1 and 2 and as will be readily understood. It will be also readily understood that these hangers 17 are so set that the pans will be supported at the proper distance above the surface of the ground and out of contact therewith so that they will not be apt to upset during travel over the rough surface.

Connected in any preferred manner with one of the ground wheels 3 so as to rotate therewith is a sprocket gear 18, around which is trained a sprocket chain 19 which is also trained around a sprocket pinion 20 secured on the outer end of a shaft 21 which is mounted in suitable bearings upon a frame 22 secured to and projecting rearwardly from the arched axle of the cultivator, a supporting brace 23 being secured to the vertical member of the arched axle and extending upwardly therefrom to the frame 22, as clearly shown. This frame may be of any convenient construction which will firmly support the parts and upon its inner end is mounted an angle lever 24. The shaft 21 is provided with a crank 25 at its inner end, and a link 26 connects the said crank with the outer free end of the angle lever 24 so that the rotation of the said shaft will impart an oscillatory movement to said lever. The inner arm of the angle lever 24 is connected by a link 27 with a crank 28 extending from the rock shaft 9 so that the oscillation of the lever 24 will be imparted through said crank to the shaft to rock the same and thereby oscillate the beaters 12 so that they will be carried to and from the opposite sides of the brushes in an obvious manner. The link 27 may be engaged in any one of a plurality of openings 29 in the inner arm of the angle lever 24 so that the throw of the rock shaft and the beaters may be readily adjusted.

It will be readily seen from the foregoing description, taken in connection with the accompanying drawings, that, as the cultivator is drawn along the row of plants, the rotation of the ground wheel 3 will be imparted directly to the sprocket wheel 18 and will be transmitted through the gearing shown and described to the rock shaft 9 so that the brushes or beaters 12 will be vibrated, as indicated by the dotted lines in Fig. 3, and caused to impinge rapidly upon the plants so that the insects and imperfect bolls will be dislodged and will drop into the pans 16 disposed below the beaters and below the foliage of the plants. The device will not impose any appreciable additional strain upon the cultivator and will operate automatically as long as the cultivator is in motion. The beaters may be provided in sufficient numbers to insure action upon all the plants in the row and through the impact of the beaters upon the plants and the consequent shaking of the plants, the insects will be dislodged and fall at once into the gathering pans. My attachment can be readily applied to any cultivator at a low cost and in a short period of time without the employment of skilled labor.

It is to be understood that while I have specifically mentioned boll weevils in the foregoing description, the apparatus may be employed for removing and destroying beetles and all other similar pests which feed upon growing plants.

Having thus described the invention, what is claimed as new is:

1. The combination with a wheeled frame, of a rock shaft supported centrally and longitudinally in said frame, clamp collars secured in spaced relation along said rock shaft, beaters rigidly mounted in said clamp collars, said beaters extending alternately in radial planes set at substantially 90° from the axis of the rock shaft, and all of said beaters being rearwardly and parallelly inclined in said planes.

2. The combination with a wheeled frame, of a rock shaft supported centrally and longitudinally in said frame, clamp collars secured in spaced relation along said rock shaft, beaters rigidly mounted in said clamp collars, said beaters extending alternately in radial planes set at substantially 90° from the axis of the rock shaft, and all of said beaters being rearwardly and parallelly inclined in said planes, said beaters including straight shanks and brushes at the free ends of the shanks.

3. The combination with a wheeled frame, of a rock shaft supported centrally and longitudinally in said frame, clamp collars secured in spaced relation along said rock shaft, beaters rigidly mounted in said clamp collars, said beaters extending alternately in radial set planes at substantially 90° from the axis of the rock shaft, all of said beaters being rearwardly and parallelly inclined in said planes, an elbow lever fulcrumed in said frame, one arm of said elbow lever having operative connection with the rear end of said rock shaft, a crank shaft carried transversely in said frame, means connected with one of the wheels of the frame adapted to rotate said crank shaft, operative connection between the crank shaft and the other arm of said elbow lever, gathering pans in juxtaposition below said beaters, the rear ends of said pans being flexibly supported in said frame, a transverse rod secured at the forward end of said frame, and chain connection between the free ends of said transverse rod and the forward ends of said gathering pans.

4. The combination with a wheeled frame, of a rock shaft supported centrally and longitudinally in said frame, beaters secured in spaced relation along said rock shaft and extending alternately in radial planes set at substantially 90° from the axis of the rock shaft, and all of said beaters being rearwardly and parallelly inclined in said planes.

In testimony whereof I affix my signature.

GEORGE W. WISELEY. [L. S.]